United States Patent
Zarcone

(10) Patent No.: US 10,108,579 B2
(45) Date of Patent: Oct. 23, 2018

(54) REMOTE MESSAGING USING TARGET MEMORY LOCATION

(71) Applicant: Comcast Cable Communications, LLC, Philadelphia, PA (US)

(72) Inventor: Christopher Zarcone, Marlton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 470 days.

(21) Appl. No.: 14/697,845

(22) Filed: Apr. 28, 2015

(65) Prior Publication Data

US 2016/0321211 A1   Nov. 3, 2016

(51) Int. Cl.
G06F 15/167   (2006.01)
H04L 29/08   (2006.01)
G06F 17/30   (2006.01)
G06F 3/06   (2006.01)

(52) U.S. Cl.
CPC ............ *G06F 15/167* (2013.01); *G06F 3/061* (2013.01); *G06F 3/067* (2013.01); *G06F 3/0635* (2013.01); *G06F 17/30861* (2013.01)

(58) Field of Classification Search
CPC .. G06F 15/17331; G06F 15/167; G06F 3/061; G06F 3/0635; G06F 3/067; G06F 17/30861; G06F 3/0659; H04L 61/2038; H04L 67/1097; H04L 61/6004; H04L 61/6059
See application file for complete search history.

(56) References Cited

U.S. PATENT DOCUMENTS

| | | | | |
|---|---|---|---|---|
| 8,151,348 | B1 * | 4/2012 | Day | H04L 63/1408 709/224 |
| 8,995,275 | B1 * | 3/2015 | Iovine | H04L 45/16 370/228 |
| 9,571,541 | B1 * | 2/2017 | Bishara | H04L 49/201 |
| 2001/0044867 | A1 * | 11/2001 | Tsou | G06F 13/4004 710/305 |
| 2004/0083369 | A1 * | 4/2004 | Erlingsson | G06Q 20/401 713/176 |
| 2004/0088477 | A1 * | 5/2004 | Bullen | H04L 49/901 711/109 |
| 2005/0058129 | A1 | 3/2005 | Jones et al. | |

(Continued)

OTHER PUBLICATIONS

Jonathan Thyer (Covert Data Storage Channel Using IP Packet Headers, SANS Institute, Feb. 7, 2008).*

(Continued)

*Primary Examiner* — Quang N Nguyen
*Assistant Examiner* — Billy H Ng
(74) *Attorney, Agent, or Firm* — Baker & Hostetler LLP

(57) ABSTRACT

Systems and methods for remote signaling are disclosed. One method can comprise receiving, by a destination node, a data packet having a source address associated with source node comprising an interface identifier of the source node, comparing at least a portion of the source address to one or more memory locations of the destination node, identifying a select memory location of the one or more memory locations based upon the comparing at least the portion of the source address to the one or more memory locations of the destination node, and causing execution of an executable instruction stored at the identified memory location.

33 Claims, 6 Drawing Sheets

(56) References Cited

U.S. PATENT DOCUMENTS

| | | | |
|---|---|---|---|
| 2009/0198792 A1* | 8/2009 | Wittenschlaeger | G06F 9/54 709/215 |
| 2010/0153706 A1* | 6/2010 | Haddad | H04L 63/0407 713/153 |
| 2013/0111211 A1* | 5/2013 | Winslow | H04L 9/3234 713/171 |

OTHER PUBLICATIONS

Thyer, "Covert Data Storage Channel Using IP Packet Headers", SANS Institute, Jan. 30, 2008, 55 pages.

* cited by examiner

REMOTE MESSAGING USING TARGET MEMORY LOCATION

BACKGROUND

Communications protocols such as the Internet Protocol (IP) continue to develop. For example, new versions (e.g., IPv6) of the IP define new structure of the protocol header. As such, various forms of remote messaging or signaling (e.g., covert data communication) have been developed for IPv6, such as manipulating the contents of header fields unique to IPv6, manipulating the existence and/or contents of various IPv6 extension headers, and subverting IPv6's Neighbor Discovery Protocols (for local-scope nodes). One issue with all of the proposed approaches for remote signaling is that as protocols and related communication mechanisms develop, the existing approaches gradually lose effectiveness over time. This disclosure addresses such and other shortcomings related to remote signaling.

SUMMARY

It is to be understood that both the following general description and the following detailed description are exemplary and explanatory only and are not restrictive, as claimed. Methods and systems for remote messaging and signaling are disclosed. The methods and systems described herein, in one aspect, can embed and transmit covert information.

Methods can comprise determining a memory location of a destination node. A network interface of a source node can be configured based upon the determined memory location. One or more data packets can be prepared a data packet including information representing a source address and the determined memory location. The prepared data packet can be transmitted, for example, to the destination node.

Methods can comprise receiving a data packet having a source address. The source address of the received data packet can be verified. Upon verification of the source address, a memory location can be identified based upon the verified source address. An executable instruction stored at the identified memory location can be executed.

Methods can comprise receiving, by a destination node, a data packet having a source address associated with source node. The source address can comprise an interface identifier of the source node. At least a portion of the source address can be compared to one or more memory locations of the destination node. A select memory location of the one or more memory locations can be identified based upon the comparing at least the portion of the source address to the one or more memory locations of the destination node. An executable instruction stored at the identified memory location can be executed.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

In an aspect, an IP address and other fields in a data packet can be used to embed covert information to be transmitted to a destination (e.g., receiving node). A complete Internet Protocol version 6 address or equivalent version can comprise two parts: a subnet prefix and an interface identifier ("IID"). As an example the IID can be a 64-bit IID, which aligns with mainstream 64-bit computer architectures. Among other things, this makes it possible to store a complete 64-bit memory address (physical address or virtual address) inside an IID, which in turn is used to form a complete IPv6 address. In this context, an IPv6 address is used to transmit a reference to a target memory location in the receiving node. As an example, the target memory location could contain a data structure, such as an integer or a string of characters. As a further example, the location could be an entry point for executable code. In this manner, receipt of a specially crafted IPv6 packet could serve as an indication to start executing code at a defined memory location. In effect, the mechanism could be used for remotely executing code on another networked node, effectively serving as a remote signaling mechanism.

Figure 1:
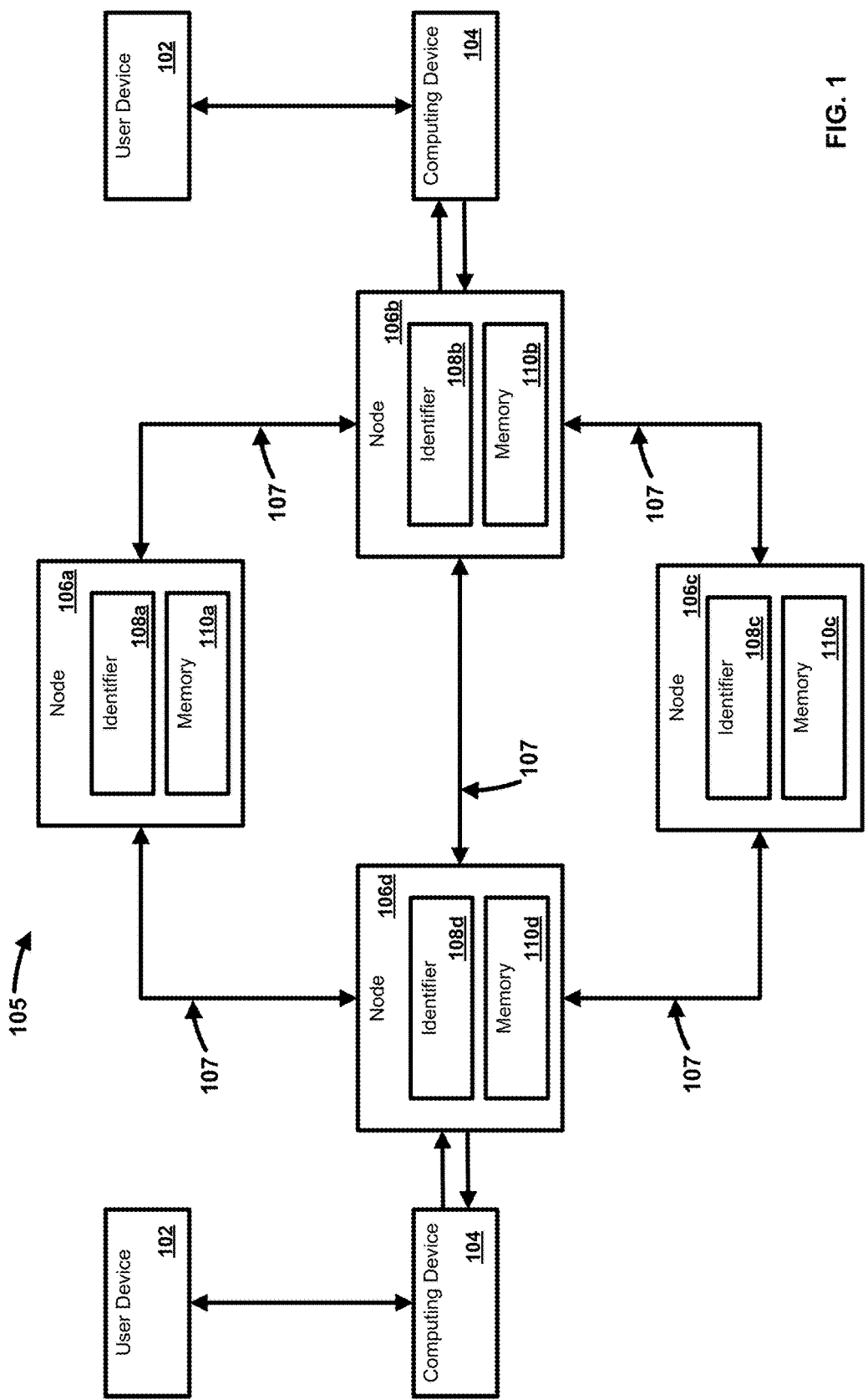
FIG. 1 is a block diagram of an example system and network.

FIG. 1 illustrates various aspects of an exemplary network in which the present methods and systems can operate. The present disclosure is relevant to systems and methods for managing a network, for example. Those skilled in the art will appreciate that present methods may be used in various types of networks and systems that employ both digital and analog equipment. The system is described as comprised of elements. An element can be software, hardware, or a combination of software and hardware. One skilled in the art will appreciate that provided herein is a functional description and that the respective functions can be performed by software, hardware, or a combination of software and hardware.

The system and network can comprise a user device 102 (e.g., physical computer host, virtual machine, IP-capable device) in communication with a computing device 104 such as a server or Network Interface Device (NID), for example. The computing device 104 can be disposed locally, or remotely, relative to the user device 102. As an example, one or more user devices 102 and/or computing devices 104 can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. The computing device 104 can be a server, a gateway, customer premises equipment (CPE), network interface device (NID), optical networking unit (ONU), headend, terminal server, cable modem terminal system, or other network device to facilitate communication via the network 105. As an example, the computing device 104 can communicate with the user device 102 and the network 105 to provide services. As a further example, the computing device 104 can allow the user device 102 to interact with remote resources, such as data, devices, and files.

As shown in FIG. 1, the network 105 can comprise a plurality of nodes 106a, 106b, 106c, 106d can be in communication with one or more user devices 102 and/or one or more computing devices 104. One or more of the nodes 106a, 106b, 106c, 106d can be a network access point, router, switch, network interface, or other communication device. As an example, one or more of the nodes 106a, 106b, 106c, 106d can be configured to communicate with at least one of the other of the nodes 106a, 106b, 106c, 106d and/or one or more of the computing devices 104 via one or more communication paths 107. In an aspect, the one or more communication paths 107 can comprise one or more uninterrupted communication links, sequential links, pre-defined paths or links, and/or intervening nodes. Links can comprise a single point-to-point connection between two devices or access points. Paths can comprise one or more links. As an example, one or more of the communication paths 107 can comprise one or more of the nodes 106a, 106b, 106c, 106d. As a further example, one or more of the nodes 106a, 106b, 106c, 106d can be configured as a mesh network. In an aspect, one or more of the communication paths 107 can be configured to transmit one or more services.

One or more of the nodes 106a, 106b, 106c, 106d can comprise an identifier 108a, 108b, 108c, 108d. As an example, the identifiers 108a, 108b, 108c, 108d can be any identifier, token, character, string, or the like, for differentiating one node 106a, 106b, 106c, 106d from another node 106a, 106b, 106c, 106d. As a further example, the identifiers 108a, 108b, 108c, 108d can comprise information relating to a network interface of the respective node 106a, 106b, 106c, 106d. Other information can be represented by the identifiers 108a, 108b, 108c, 108d.

In certain aspects, one or more of the identifiers 108a, 108b, 108c, 108d can comprise an IPv6 address format, for example, as follows:

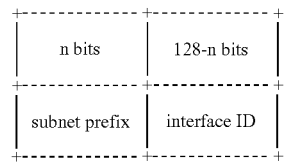

As an example, the subnet prefix can be variable length. As another example, the subnet prefix can have a 64 bit length, which leaves the remaining 64 bits (128-64=64 bits) to uniquely identify an interface on the associated node 106a, 106b, 106c, 106d. As a further example, the remaining bits can define the Interface Identifier ("IID") and can be used to embed one or more covert messages. In this context, an IPv6 address can be used to transmit a reference to a location in the destination (receiving) node's memory 110a, 110b, 110c, 110d.

In an aspect, the memory 110a, 110b, 110c, 110d of the respective nodes 106a, 106b, 106c, 106d can contain a data structure, such as an integer or a string of characters. Alternatively, the memory 110a, 110b, 110c, 110d can be any entry point for executable code. In this manner, receipt of a specially crafted IPv6 packet could serve as an indication to start executing code at a defined memory location. In effect, the specially crafted IPv6 packet or similar mechanism can be used for remotely executing code on another networked node 106a, 106b, 106c, 106d and/or a user device 120, for example.

In certain aspect, two classes of memory addresses can be used, namely, physical memory addresses and virtual memory addresses. Physical memory addresses can represent specific cells of storage in physical hardware. Physical memory addresses can be unique, such that only one element of data can occupy a physical memory location at any given time. As an example, the remotely signaled code can reside in privileged memory space, such as an operating system's kernel, or device driver memory (e.g., GPU device drivers from third parties). Virtual memory addresses can represent abstractions of continuous memory space. As an example, a processor can "map" portions of virtual memory to actual physical locations. In this way, multiple processes can all share the same address space without conflicting with each other.

Figure 2:
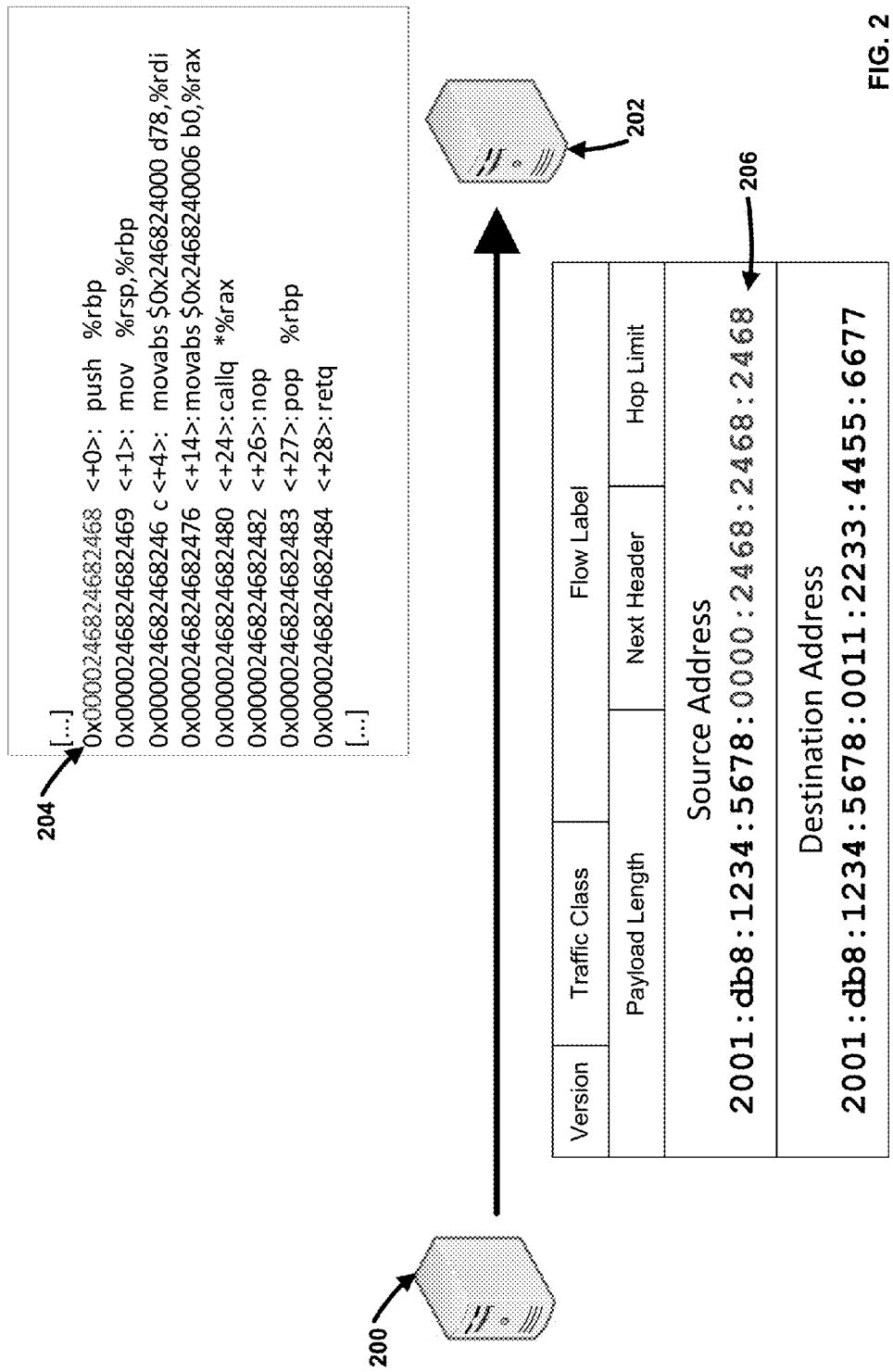
FIG. 2 is a block diagram of an example system and network.
Figure 3:
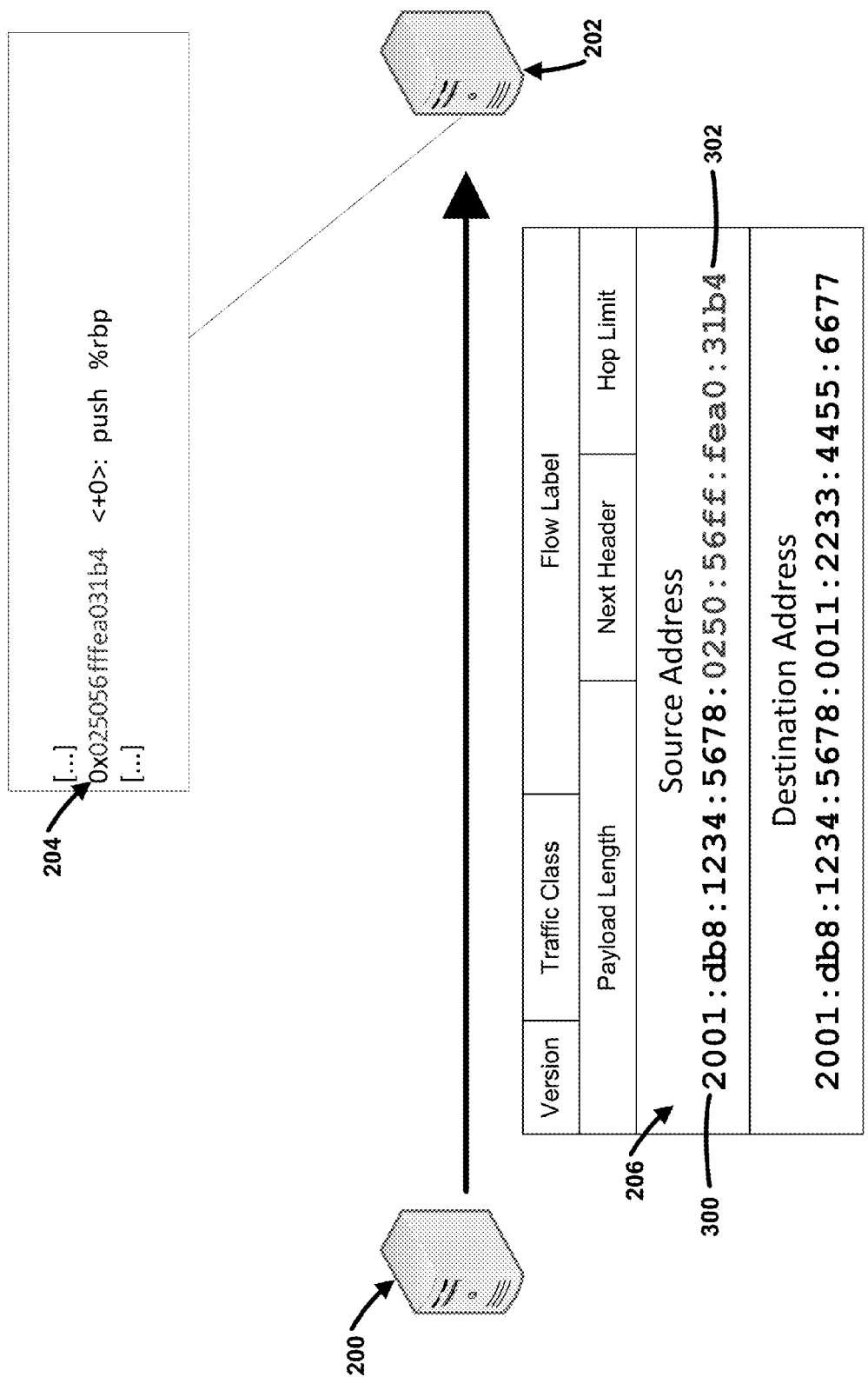
FIG. 3 is a block diagram of an example system and network.

FIGS. 2-3 illustrates end-to-end messaging, or signaling, from a source node 200 (e.g., node 106a, 106b, 106c, 106d (FIG. 1), to a destination node 202 (e.g., node 106a, 106b, 106c, 106d and/or user device 102 (FIG. 1) and finally to a specific memory location 204 (e.g., virtual memory) associated with the destination node 202 and/or the user device 102. In an aspect, memory location 204 can include executable code that can be signaled for execution. As such, the source node 200 can prepare an IPv6 packet with a specially crafted source address 206 (e.g., with an IID that contains a target memory location on the receiver). As an example, a packet can be prepared with information representing a source address 206 using the native IPv6 address of the source node 200, which can be specifically configured to represent the known memory location 204. As another example, if the address of a network interface of the source node 200 is configured based on the memory location 204, sent packets can inherit the source address of the configured interface. As a further example, a packet can be prepared using tools such as Scapy or equivalent logic to spoof a source address and prepare the packet using the spoofed address.

Remote messaging similar to the illustrative example of FIG. 2 can serve any number of purposes, including but not limited to: commanding the destination node 202 (e.g., network node, user device, etc.) to restart or reload configuration, notifying the destination node 202 that updated firmware, software or configuration is available for download, and/or updating the destination node 202 as to the availability of new licenses or entitlements (e.g. for digital rights management scenarios). There are also situational reasons why remote signaling of this nature may be desired, such as, scenarios where the ability to reach the receiving node using standard management protocols (such as SNMP or TR-069) may be limited or blocked, and/or scenarios where clandestine communications are desired so as to avoid detection and associated countermeasures.

As an example, the destination node 202 can be a device such as user device 102 (FIG. 1) and can be infected with malicious software such as a bot or computer virus. As such, the functionality of the destination node 202 may be negatively affected. Attempts to remove the malicious software remotely may be thwarted by the selective processing of incoming packets by the malicious software or communication functions under the control of the malicious software. Accordingly, clandestine messing can be used to address the infected device. In an aspect, the destination node 202 may be pre-configured to include a security measure such as executable code, which can command the destination node 202 (e.g., network node, user device, etc.) to restart or reload configuration, notify the destination node 202 that updated firmware, software or configuration is available for download, and/or update the destination node 202 with new licenses or entitlements (e.g. for digital rights management scenarios). The security measure can be pre-loaded in the memory location 204 prior to infection by the malicious software. Once the malicious software is detected, the source node 200 can prepare packets to send a message to circumvent the malicious software and to execute the security measure in the memory location 204.

In an aspect, an encoded IID, such as information representing the source address 206, can be generated using a 64-bit memory address to comprise the IID. The encoded IID can be used to clandestinely signal to a receiving device (destination node 202) that it should begin executing code at the memory location referenced by the IID. As an example, encryption could be used to further conceal the target memory address (e.g. encrypt the target memory address, and use the encrypted result as the IID). As a further example, executable code could be stored at a memory location that resembles an automatically generated address (e.g. an address produced through Stateless Address Auto configuration (SLAAC)). As with randomly generated addresses and encrypted data, a memory address that conforms to SLAAC's structure would be extremely difficult to distinguish from an ordinary SLAAC address, such as illustrated in FIG. 3. If the target executable code can be located within 32-bit address space 300 (e.g. the target system is a 32-bit system, or the target process was built as 32-bit code, etc.) it is possible to reuse the remaining 32 bits 302 of the IID for other purposes, such as, signaling additional conditions as to whether the code should execute, signaling additional conditions as to when the code should execute, signaling a specific function or subroutine within the code, supplying arguments or variables to the executable code, and the like.

Figure 4:
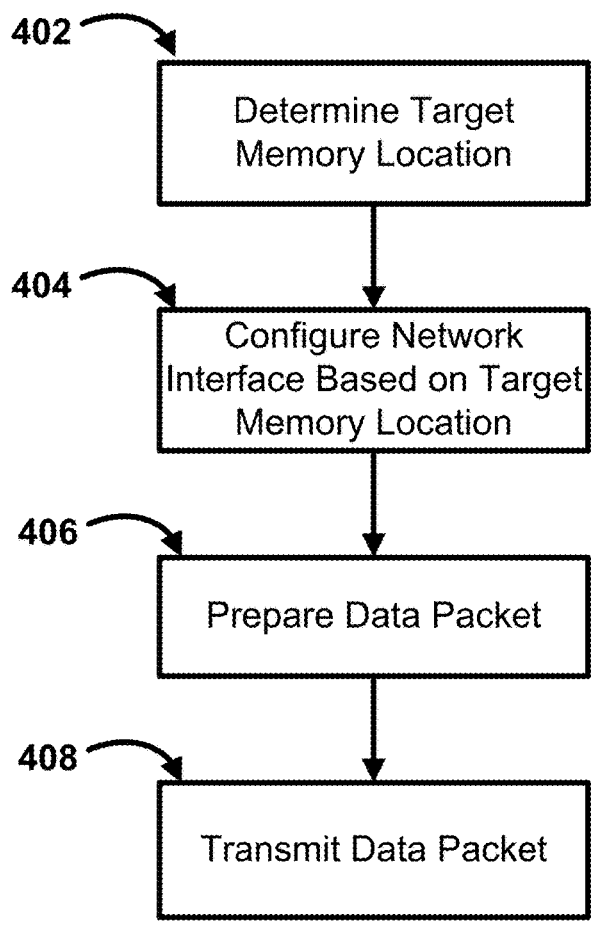
FIG. 4 is a flow chart of an example method.
Figure 5:
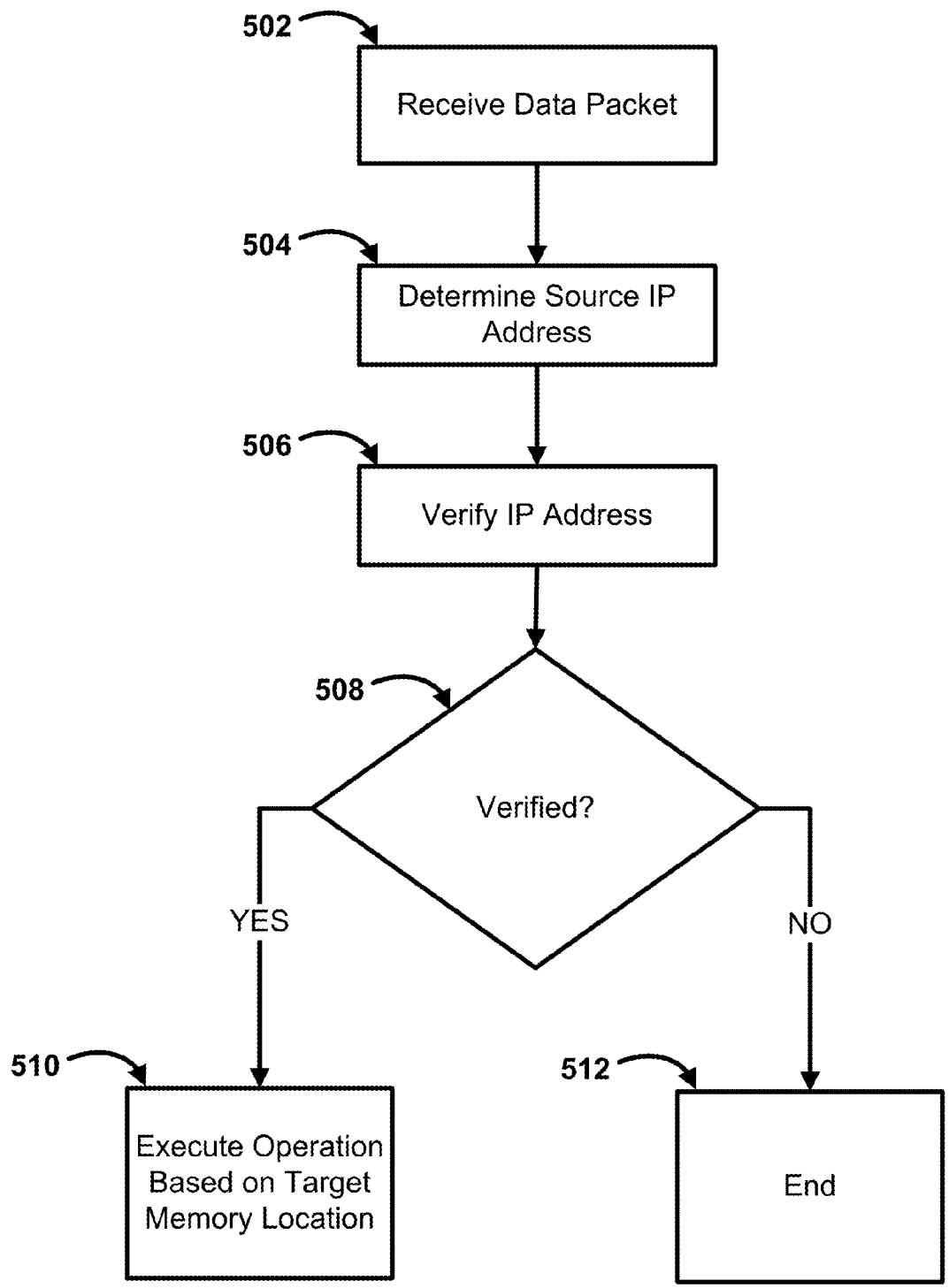
FIG. 5 is a flow chart of an example method.

FIGS. 4-5 illustrate operating procedures that can be used to embed and transmit covert information in data packets. In an aspect, FIG. 4 depicts example operating procedures that may be implemented by the systems and networks described herein. For example, in operation or step 402, a target memory location can be determined. In an aspect, the target memory location can be a specific location in the memory (e.g., physical or virtual) of a destination node or a user device. The memory location can be determined by receiving or accessing information relating to the destination node. As an illustrative example, the target memory address can be the virtual memory address 0x246824682468.

In operation or step 404, one or more network interfaces of a sending node can be configured such that packets transmitted via the network interfaces can include information representing the target memory location. For example, one or more network interfaces can be configured with a valid IP (e.g., IPv6) address. The IP address can be configured based on the determined target memory location. As an illustrative example, the IP address can be 2001:db8:1234:5678:0:2468:2468:2468/64, wherein 0x246824682468 is the target memory location at the destination node. As such, outgoing packets will include the specially crafted IP address, including the target memory location, as a source address or other packet portion (e.g., header, padding, etc.).

In operation or step 406, a data packet can be prepared via the network interface. In an aspect, a sender can prepare an IPv6 packet with a specially crafted source address (whose IID contains a target memory location on the receiver). As an example, a packet can be prepared using the sending node's native IPv6 address (2001:db8:1234:5678:0:2468:2468:2468/64), which has been configured to represent the target memory location of 0x246824682468. As another example, if the address of my network interface of the sending node is updated (e.g., from operation 404), sent packets can inherit the source address of the configured interface. As a further example, a packet can be prepared using tools such as Scapy or equivalent logic to spoof a source address and prepare the packet using the spoofed address.

In operation or step 408, the prepared data packet can be transmitted. In an aspect, the sender can transmit the prepared IPv6 packet to the destination. The destination can receive the packet and process the packet, including the target memory address, to cause a particular operation at the destination.

In an aspect, FIG. 5 depicts example operating procedures that may be implemented by the systems and networks described herein. As an example, in operation or step 502, a data packet can be accessed or received. In an aspect, a destination node can receive the prepared data packet from the operational procedures of FIG. 4. As a further example, the data packet may be received by one or more kernel- or user-space processes running at the destination node.

In operation or step 504, a source address of the received data packet can be determined. As an example, the destination node can examines the source address and can extract the interface identifier portion (e.g., hexadecimal 0:2468:2468:2468 (0x0000:2468:2468:2468)) of the source address.

In operation or step 506, the source address can be verified. In an aspect, the destination node can verifies that the extracted bit value from the source address represents a valid memory location (e.g., 0x246824682468) having executable code. For example, the destination node can verify received values against known constants using simple if/then/else logic. It is understood that a failure to execute such verification could result in calling uninitialized, unallocated or otherwise invalid areas of memory, with resultant access violation errors (e.g., segmentation faults).

Upon successful verification at 508, the destination node can execute the code at the specified memory location, as operation 510. A failed verification can end at operation 512.

As an example, destination device may be pre-configured to include a security measure such as executable code, which can command the destination device to restart or reload configuration, notify the device that updated firmware, software or configuration is available for download, and/or update the device with new licenses or entitlements (e.g. for digital rights management scenarios). The security measure can be pre-loaded in valid memory location prior to infection by malicious software or device failure. Once the malicious software or failure is detected, the source node can prepare packets to send a message to circumvent the malicious software and to execute the security measure in the valid memory location. The destination node can verify the memory location and can execute the code located at the valid memory address to cause the pre-configured security measure to execute. Such covert and remote execution of code on a device can be used to manage various scenarios where the device is not operating as normal (e.g., infected with malware, programming fault, etc.). The covert messaging can be used to circumvent malware and to recover the normal operations of the device.

Figure 6:
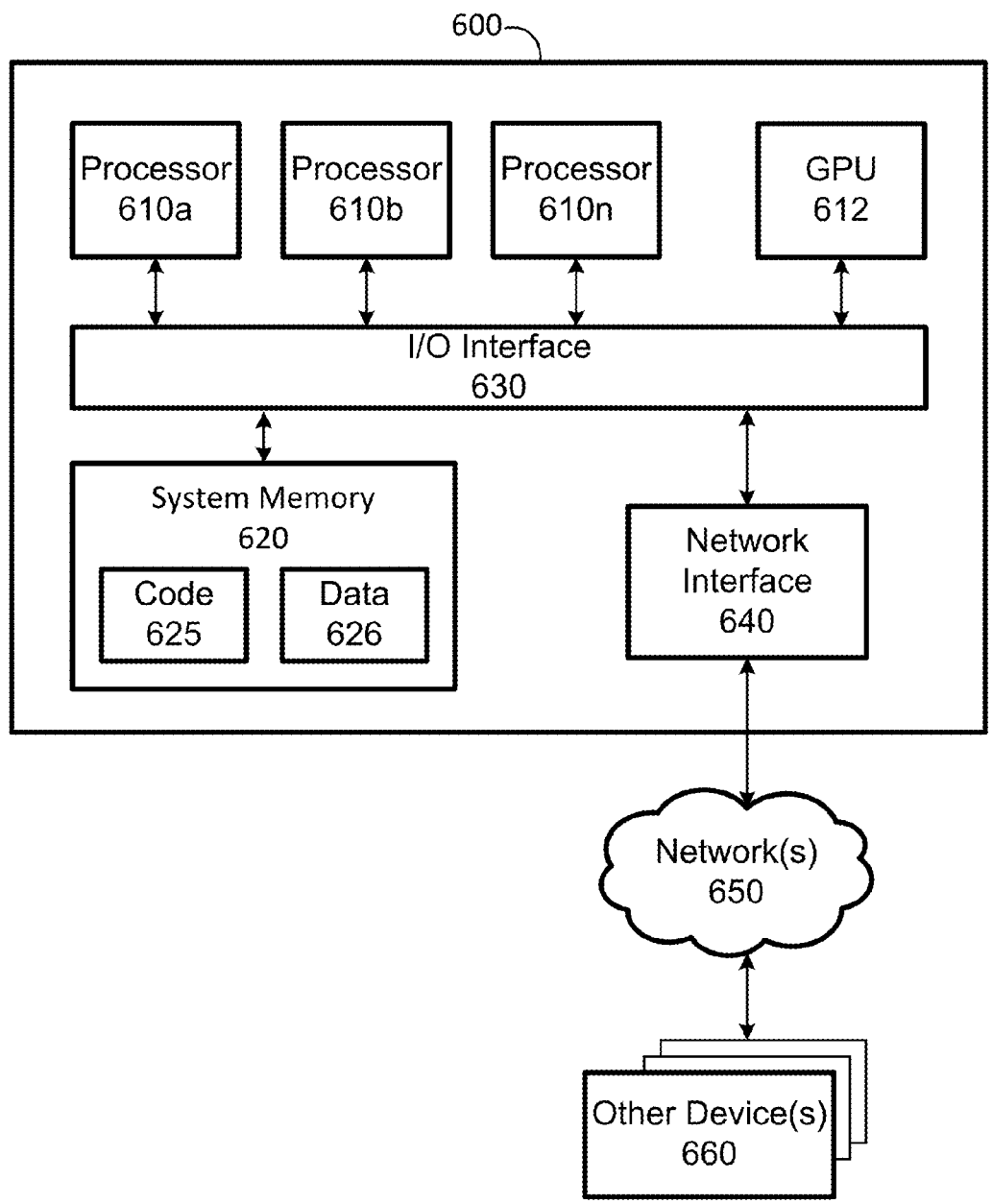
FIG. 6 is a block diagram of an example computing device.

FIG. 6 depicts a general-purpose computer system that includes or is configured to access one or more computer-accessible media. In the illustrated embodiment, computing device 600 includes one or more processors 610a, 610b, and/or 610n (which may be referred herein singularly as a processor 610 or in the plural as the processors 610) coupled to a system memory 620 via an input/output (I/O) interface 630. Computing device 600 further includes a network interface 640 coupled to I/O interface 630. As described herein one or more of the nodes 106a, 106b, 106c, 106d (FIG. 1) can be or comprise the computing device 600.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processor(s) 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between processor(s) 610, system memory 620 and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    determining, by one or more processors, a memory location of a destination node, wherein an executable instruction is associated with the memory location, wherein the destination node exhibits an improper functioning, and wherein the executable instruction is configured to at least partially remediate the improper functioning, wherein the improper functioning of the destination node is associated with malicious code, and wherein the executable instruction is configured to remediate the malicious code;
    configuring, by the one or more processors and based on the determined memory location, a network interface of a source node such that one or more data packets transmitted via the network interface comprise an indication of the determined memory location; and
    transmitting, via the network interface and to the destination node, a data packet of the one or more data packets, wherein the data packet comprises a source address associated with the source node and the indication of the determined memory location, and wherein the destination node is configured to execute, based on the data packet, the executable instruction associated with the memory location.

2. The method of claim 1, wherein the memory location comprises one or more of a physical location address and a virtual location address.

3. The method of claim 1, wherein the determining the memory location comprises receiving or accessing information relating to the destination node.

4. The method of claim 1, wherein the network interface is compatible with the Internet Protocol, and wherein the data packet is transmitted via the Internet Protocol.

5. The method of claim 1, wherein the data packet is an IPv6 data packet.

6. The method of claim 1, wherein the indication of the determined memory location is embedded into the source address associated with the data packet.

7. The method of claim 1, wherein the indication of the determined memory location is embedded into an interface identifier portion of the data packet.

8. A method comprising:
    receiving, by a destination node, a data packet comprising a source address, wherein the source address comprises an indication of a memory location at the destination node associated with an executable instruction, wherein the destination node exhibits an improper functioning, and wherein the executable instruction is configured to at least partially remediate the improper functioning, wherein the improper functioning of the destination node is associated with malicious code, and wherein the executable instruction is configured to remediate the malicious code;
    verifying the source address of the received data packet; and
    upon verification of the source address, causing, based on the source address, execution of the executable instruction stored at the memory location.

9. The method of claim 8, wherein the data packet is an IPv6 data packet.

10. The method of claim 8, wherein the data packet is received via the Internet Protocol.

11. The method of claim 8, wherein the memory location comprises one or more of a physical location address and a virtual location address.

12. The method of claim 8, wherein the indication of the memory location is embedded in the source address of the data packet via a network interface.

13. The method of claim 8, wherein the indication of the memory location is embedded in an interface identifier portion of the source address of the data packet.

14. A method comprising:
    receiving, by a destination node, a data packet having a source address associated with a source node, wherein the source address comprises an interface identifier of the source node;
    comparing, by the destination node, at least a portion of the source address to one or more memory locations of the destination node;
    identifying, by the destination node, a select memory location of the one or more memory locations based upon the comparing at least the portion of the source address to the one or more memory locations of the destination node; and
    causing execution of an executable instruction stored at the identified memory location, wherein the destination node exhibits an improper functioning, and wherein the executable instruction is configured to at least partially remediate the improper functioning, wherein the improper functioning of the destination node is associated with malicious code, and wherein the executable instruction is configured to remediate the malicious code.

15. The method of claim 14, wherein the data packet is an IPv6 data packet.

16. The method of claim 14, wherein the identified memory location comprises one or more of a physical location address and a virtual location address.

17. The method of claim 14, wherein the select memory location is identified by matching the at least a portion of the source address to the select memory location.

18. A device comprising:
one or more processors; and
memory storing instructions that, when executed by the one or more processors, cause the device to:
   determine a memory location of a destination node, wherein an executable instruction is associated with the memory location, wherein the destination node exhibits an improper functioning, and wherein the executable instruction is configured to at least partially remediate the improper functioning, wherein the improper functioning of the destination node is associated with malicious code, and wherein the executable instruction is configured to remediate the malicious code;
   configure based on the determined memory location, a network interface such that one or more data packets transmitted via the network interface comprise an indication of the determined memory location; and
   transmit, via the network interface and to the destination node, a data packet of the one or more data packets, wherein the data packet comprises a source address and the indication of the determined memory location, and wherein the destination node is configured to execute, based on the data packet, the executable instruction associated with the memory location.

19. The device of claim 18, wherein the memory location comprises one or more of a physical location address and a virtual location address.

20. The device of claim 18, wherein the indication of the determined memory location is embedded into the source address associated with the data packet.

21. The device of claim 18, wherein the indication of the determined memory location is embedded into an interface identifier portion of the data packet.

22. A device comprising:
one or more processors; and
memory storing instructions that, when executed by the one or more processors, cause the device to:
   receive a data packet comprising a source address, wherein the source address comprises an indication of a memory location at the device associated with an executable instruction, wherein the device exhibits an improper functioning, and wherein the executable instruction is configured to at least partially remediate the improper functioning, wherein the improper functioning is associated with malicious code, and wherein the executable instruction is configured to remediate the malicious code;
   verify the source address of the received data packet; and
   upon verification of the source address, cause, based on the source address, execution of the executable instruction stored at the memory location.

23. The device of claim 22, wherein the memory location comprises one or more of a physical location address and a virtual location address.

24. The device of claim 22, wherein the indication of the memory location is embedded into the source address.

25. The device of claim 22, wherein the indication of the memory location is embedded into an interface identifier portion of the data packet.

26. A non-transitory computer-readable medium comprising computer-executable instructions that when executed by at least one processor perform a method comprising:
   determining a memory location of a destination node, wherein an executable instruction is associated with the memory location, wherein the destination node exhibits an improper functioning, and wherein the executable instruction is configured to at least partially remediate the improper functioning, wherein the improper functioning of the destination node is associated with malicious code, and wherein the executable instruction is configured to remediate the malicious code;
   configuring based on the determined memory location, a network interface such that one or more data packets transmitted via the network interface comprise an indication of the determined memory location; and
   transmitting, via the network interface and to the destination node, a data packet of the one or more data packets, wherein the data packet comprises a source address and the indication of the determined memory location, and wherein the destination node is configured to execute, based on the data packet, the executable instruction associated with the memory location.

27. The non-transitory computer-readable medium of claim 26, wherein the memory location comprises one or more of a physical location address and a virtual location address.

28. The non-transitory computer-readable medium of claim 26, wherein the indication of the determined memory location is embedded into the source address associated with the data packet.

29. The non-transitory computer-readable medium of claim 26, wherein the indication of the determined memory location is embedded into an interface identifier portion of the data packet.

30. A non-transitory computer-readable medium comprising computer-executable instructions that when executed by at least one processor perform a method comprising:
   receiving, by a destination node, a data packet comprising a source address, wherein the source address comprises an indication of a memory location at the destination node associated with an executable instruction, wherein the destination node exhibits an improper functioning, and wherein the executable instruction is configured to at least partially remediate the improper functioning, wherein the improper functioning of the destination node is associated with malicious code, and wherein the executable instruction is configured to remediate the malicious code;
   verifying the source address of the received data packet; and
   upon verification of the source address, causing, based on the source address, execution of the executable instruction stored at the memory location.

31. The non-transitory computer-readable medium of claim 30, wherein the memory location comprises one or more of a physical location address and a virtual location address.

32. The non-transitory computer-readable medium of claim 30, wherein the indication of the memory location is embedded into the source address.

33. The non-transitory computer-readable medium of claim 30, wherein the indication of the memory location is embedded into an interface identifier portion of the data packet.

* * * * *